United States Patent [19]
Rocton

[11] 3,780,210
[45] Dec. 18, 1973

[54] CONNECTION DEVICE FOR SUBMARINE REPEATER

[75] Inventor: Lucien Rocton, Malakoff, France

[73] Assignee: Campagnie Industrielle des Telecommunications Cit-Alcatel,, Paris, France

[22] Filed: Dec. 18, 1972

[21] Appl. No.: 316,027

[52] U.S. Cl............. 174/70 S, 174/21 C, 174/88 C
[51] Int. Cl............................................. H02g 15/14
[58] Field of Search............. 174/21 C, 22 R, 23 R, 174/70 S, 86, 88 C

[56] References Cited
UNITED STATES PATENTS
3,349,163  10/1967  Rocton............................. 174/70 S
3,454,707   7/1969  Langmack et al................. 174/70 S
3,600,499   8/1971  Hibbs................................ 174/70 S FOREIGN PATENTS OR APPLICATIONS
702,105  1/1965  Canada............................. 174/70 S Primary Examiner—Laramie E. Askin
Attorney—Paul M. Craig, Jr. et al.

[57] ABSTRACT

Connection device for connecting a submarine repeater and a coaxial cable having an outside conductor made of aluminum, comprising particular means to be implemented for connecting a repeater to a submarine cable of the coaxial type whose outer conductor is made of aluminum, these means being imposed by the necessity of avoiding the forming of an electrochemical couple between the aluminum of the line cable and the copper of the connecting cable of the repeater having sea water as its electrolyte.

8 Claims, 4 Drawing Figures

CONNECTION DEVICE FOR SUBMARINE REPEATER

The invention comes within the branch of the construction of telephonic links by submarine cables equipped with repeaters. It concerns particular means to be implemented for connecting a repeater to a submarine cable of the coaxial type whose outer conductor is made of aluminum, these means being imposed by the necessity of avoiding the forming of an electrochemical couple between the aluminum of the line cable and the copper of the connecting cable of the repeater, having sea water for its electrolyte. The invention applies to submarine connections equipped with a cable having an outer conductor made of aluminum.

The invention applies to a repeater structure, in which the metal the made of steel containing the amplifying elements of the repeater is insulated from the sea by a polyethylene or similar coating shown ensures fluid-tight sealing thereof, and, moreover, the insulation of the supply voltage, which is supplied to the various repeaters by the cable itself coming from a terminal station.

Such submarine repeaters must now equip links in which the coaxial line cable comprises, for reasons of economy, an outer conductor made of aluminum, the inner conductor still being made of copper as in the past.

The connection between the line cable and the repeater is effected by a coaxial connecting cable whose two conductors are made of copper.

Moreover, in the zone where the ends of the two adjacent cables are connected together, an articulation element (cardan) made of steel, fast, on the one hand, with the box of the repeater, on the other hand, with the insulating covering of the line cable, ensures mechanical continuity between the one and the other, while allowing necessary play at the time of winding on the drum of the cable ship, and also at the time of laying.

Usually, the connecting of the outer conductor of the connecting cables to the potential of the sea is effected either by the ground potential of the repeater box when that box is directly in contact with the sea, or by the ground potential of the cardan seal when the box is insulated from the sea, the said cardan seal then being directly connected to the braiding forming the outer conductor of the connecting cables, and to the outer conductor of the line cable.

The object of the device according to the invention is therefore to dispense with the electric contact between the parts of the steel or copper metal cardan seal and the outer conductor of the line cable.

A further object is to ensure fluid-tight sealing of the connection between the copper of the connecting cable and the aluminum of the line cable by extending the fluid-tight sealing of the outer copper conductor of the connecting cable up to the line cable.

Another object is to adjoin an electrode ensuring the grounding in the sea of the copper outer conductor of the connecting cable, that electrode being made of aluminum or aluminum alloy.

The invention will be described with reference to the accompanying drawings, among which:

Figure 1:
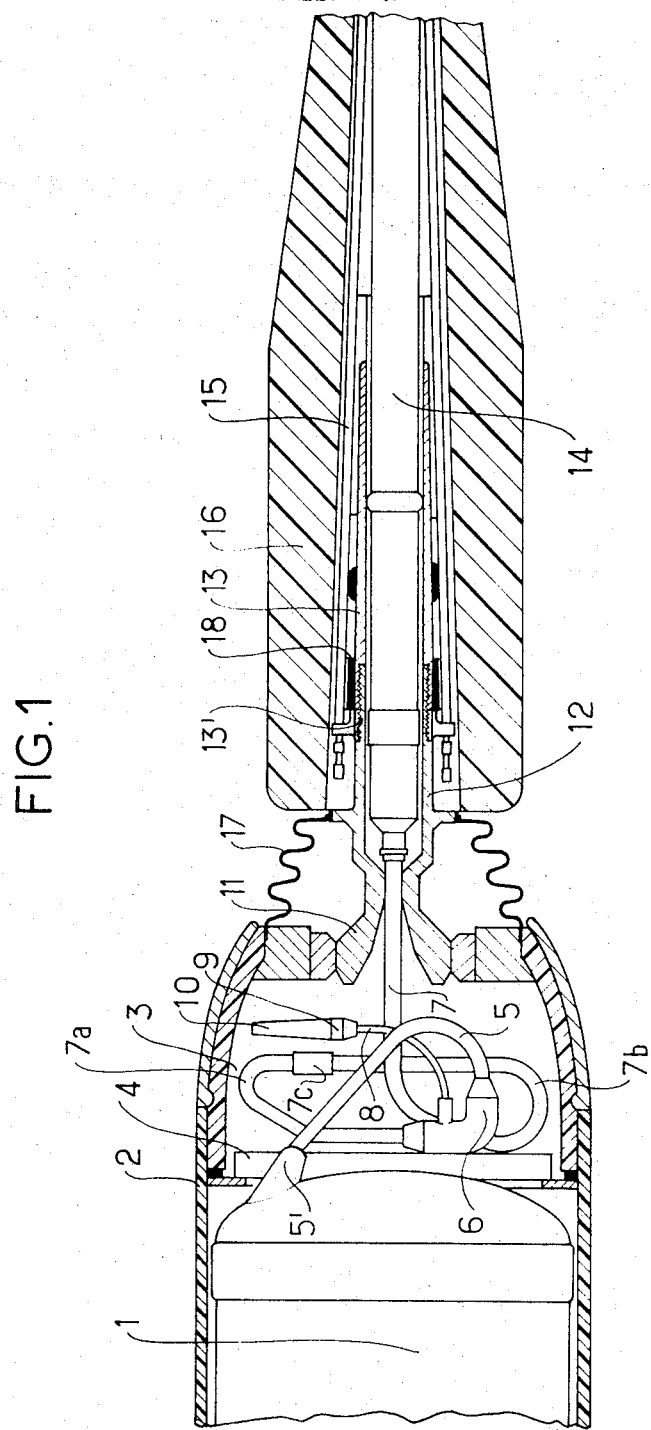
FIG. 1 is a diagrammatic partial sectional view showing the connecting of one end of a repeater to the line cable, through an inlet cable and a connecting cable.

FIG. 1. The repeater is contained in a steel box (not visible) covered with a polyethylene cover 1. The assembly is contained in a stratified glass-epoxy frame 2 which extends outwards around a part 3 forming a chamber. The bottom of the said chamber is formed by an aluminum plate 4. The copper-copper inlet coaxial cable 5 with a polyethylene cover has its cover soldered at 5' to the polyethylene cover 1. The cable 5 is terminated by a part 6 in the shape of a butt from which two connections leave. The first connection is a copper-copper coaxial cable 7 in a polyethylene cover for connecting to the line cable. This cable 7 comprises two parts, 7a on the repeater side, 7b on the line cable side, connected together by a "ship connection" 7c.

The second connection extending from butt 6 is an insulated conductor 8 forming a link with an aluminum electrode 10 through a sleeve 9. In reality, the aluminum electrode 10 does not occupy the place where it is situated in FIG. 1; rather, it is embedded in the plate 4. It has been shown detected from the plate 4 to facilitate its illustration.

The front part of the chamber 3 is occupied by steel parts 11 forming a cardan seal whose most forward portion 12 is screwed at 13' into a steel sleeve 13 surrounding the end of an aluminum-copper line cable 14.

The end of a steel protection wire surrounding the end of the line cable 14 and passing above the parts 12 and 13 is seen at 15. The end of the line cable 14 is surrounded by an elastomer cover 16. A flexible elastomer sleeve 17 connects the end of the frame 2 to the part 12. The chamber 3 and the inside of the sleeve 17 contain sea water, in the submerged state. An elastomer pad between the protection wires 15 and the sleeve 13 is seen at 18.

Figure 2:
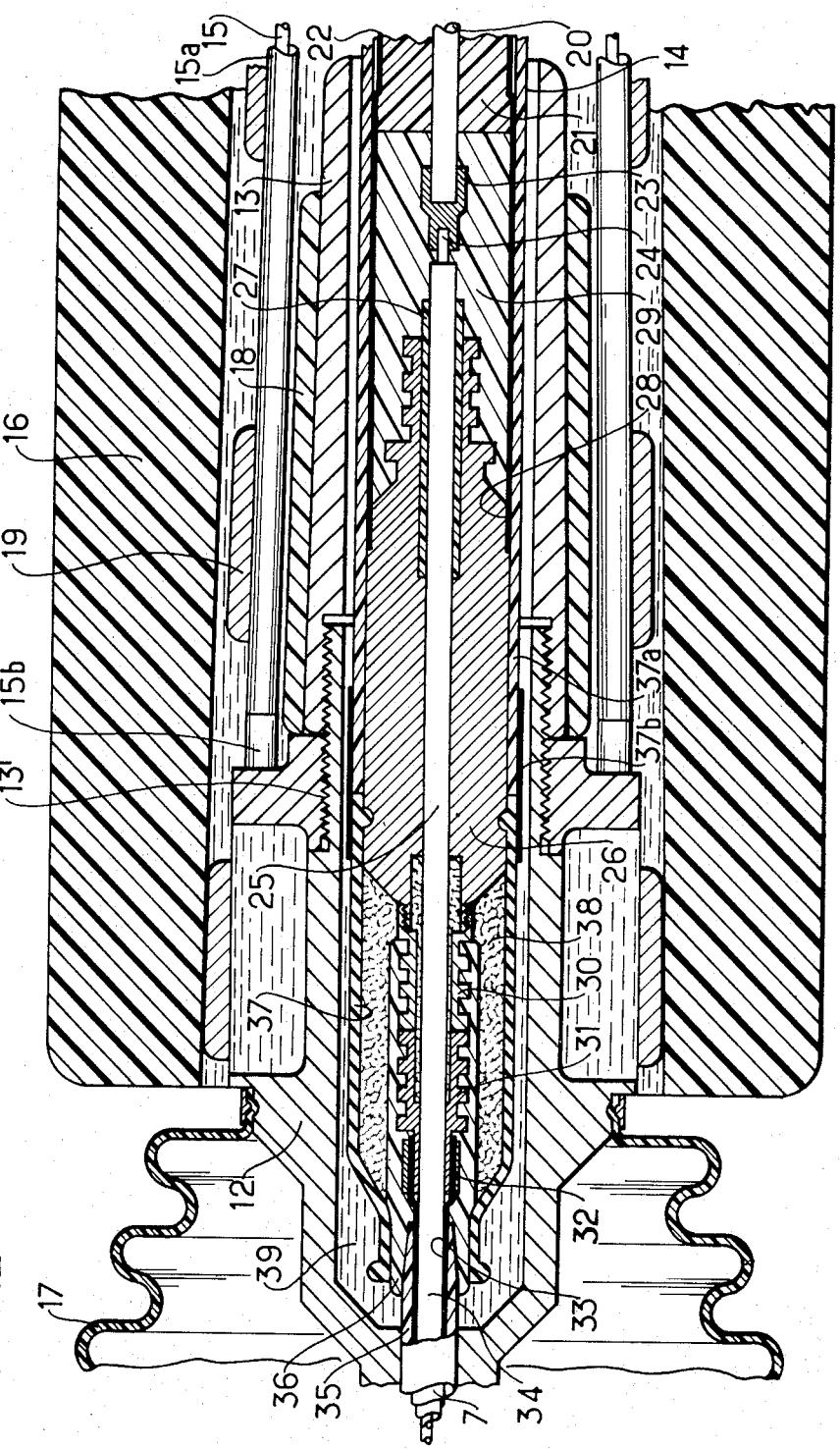
FIG. 2 is a detail of FIG. 1 on a larger scale.

FIG. 2. Reference numerals 12 to 18 have the same significance as in FIG. 1. Numeral 15a designates a neoprene cover surrounding the protection wire 15. Numeral 15b designates an insulating end fitting.

A clamp element 19 made of steel wires is shown surrounding the protection element which is constituted by a set of wires, such as wires 15. The line cable 14 comprises a copper inner conductor 20, a polyethylene insulator 21, and an aluminum outer conductor 22.

A copper line part 23 surrounds, by its front end, tee conductor 20 and by its back end, the copper inner conductor 24 of the connecting cable 7 whose central part, not sown as a sectional view, is illustrated at 25.

An aluminum coupling part 26 surrounds the portion 25 of the connecting cable. A polytetrafluoroethylene ring 27 (registered trademark Teflon) is inserted between the front portion of the part 26 and the portion 25 of the connecting cable 7. There is a connection at 28 between the aluminum part 26 and the aluminum conductor 22 of the line cable. A polyethylene molded part 29, soldered to the insulator 21 of the line cable 14 surrounds the front end of the part 26, and is soldered to the insulator of the conductor 22.

The rear end 30 of the aluminum part 26, having a smaller diameter, is soldered by friction in a known manner to a copper part 31, which is soldered at 32 on the front end of the outer copper conductor 33 of the back part 34 of the connecting cable 7. The complete cable inlet of the connecting cable 7 (FIG. 2) is shown on the left of the figure. That part 34 of the connecting cable 7 is surrounded by a polyethylene cover 35, on which a polyethylene cover 36 which surrounds the solder 32, the part 30 and 31, is soldered.

A sleeve 37 made of neoprene or the like (an elastomer compatible with polyethylene) surrounds part of the cover 36 and part of the aluminum part 26. The central zone 38 which does not adhere to the cover 36 is filled with a compound, polyisobutylene, for example. A tape 37b forms a seal at the connection between the neoprene sleeve 37 and the polyethylene cover 37a.

Between the inside of the steel part 12 and the sleeve 37, there is a chamber 39 full of sea water, in the submerged state.

Figure 3:
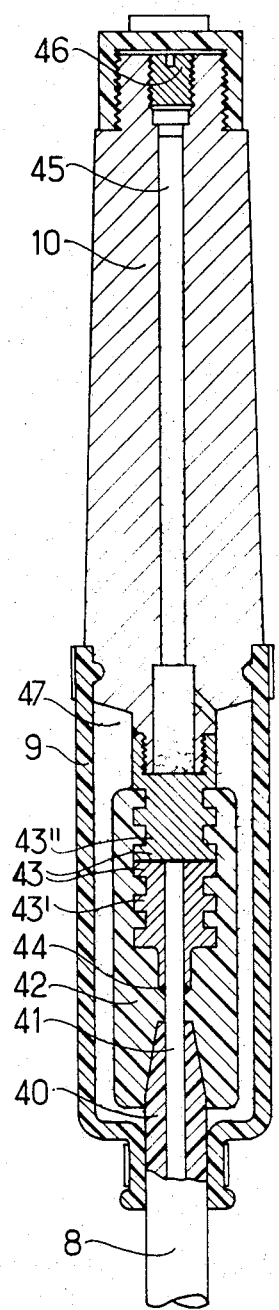
FIG. 3 is a sectional view showing the connecting of an aluminum or aluminum alloy electrode to an insulated copper conductor.

FIG. 3. In FIG. 3, the electrode 10 is shown in detail. The connecting conductor 8 under a polyethylene cover enters the sleeve 9 of the aluminum electrode 10, formed by a neoprene sleeve. The polyethylene insulator 40, surrounding the copper conductor 41 of the connecting cable 8 is soldered to a polyethylene cover 42, whose front part surrounds a hybrid connecting part 43 in two parts, one back part 43', made of copper, which surrounds the copper conductor 41 and is soldered to it at 44, and a front part 43'', made of aluminum, the two parts being soldered by friction in a known manner.

The aluminum electrode 10 is connected, for example, by a screw thread, to the front end of the aluminum part 43'' of the part 43. It is crossed, along its axis, by a duct 45, which ends in a stopper 46. There is a chamber 47, inside the sleeve 9, which is filled with a compound (polyisobutylene or the like) through the duct 45, by unscrewing the stopper 46.

Figure 4:
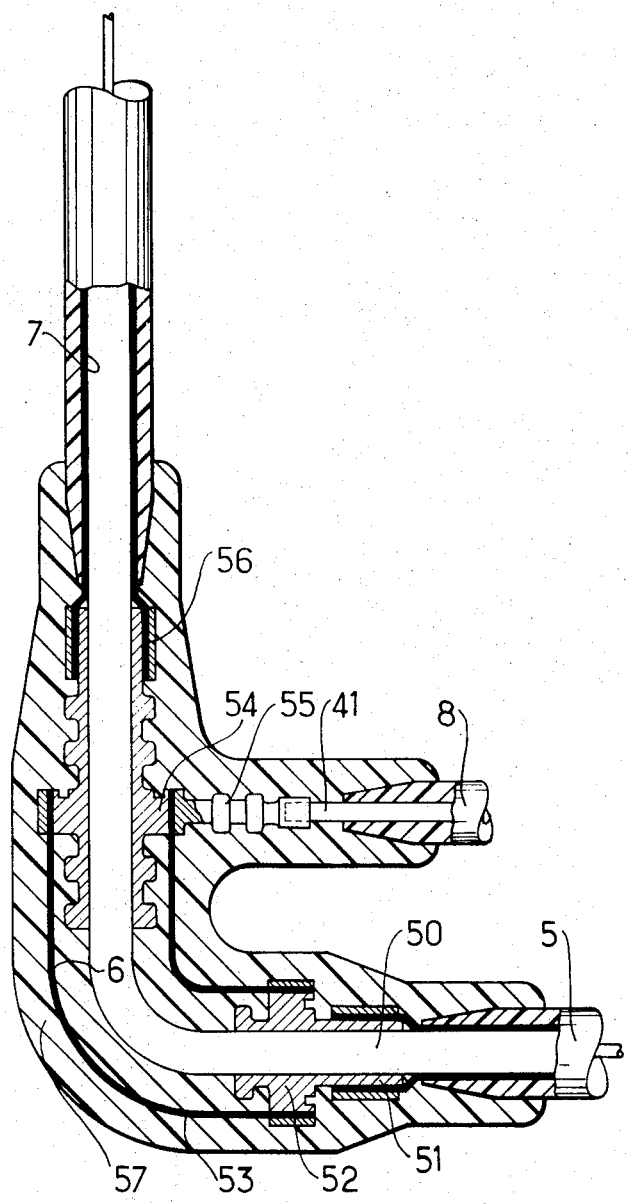
FIG. 4 is a partial sectional view showing the connecting of the said insulated conductor to the inlet cable of the repeater.

FIG. 4. The coaxial copper-copper inlet cable 5 is connected in the polyethylene butt 6 to the coaxial copper-copper connecting cable 7 and to the insulated connecting conductor 8.

The outer conductor 51 of the cable 5 has its end inserted in a copper connecting part 52, a part of which is connected to a copper right-angled elbow part 53. The end of the elbow 53 is connected to another copper extension part 54.

The inner conductor of the inlet cable 5 surrounded by polyethylene insulator 50 continues its way inside the parts 52 and 54, through axial channels with which each of these parts is provided. The part 54 comprises, on one side, an extension 55 to which is connected a conductor 41 (see FIG. 3), which emerges from the butt 6 in the form of an insulated conductor 8. The outer conductor of the coaxial connecting cable 7 is connected at 56 to the front part of the part 54. All these parts are coated with a polyethylene cover 57 forming the butt 6 (FIG. 1).

What is claimed is:

1. A device for connecting a submarine repeater to a coaxial line cable having an aluminum outer conductor and a copper inner conductor, wherein said repeater is provided in a polyethylene covered box into which extends a copper-copper coaxial inlet cable for connection to said repeater, the connecting device comprising a hybrid connecting element formed of an aluminum part joined to a copper part which is connected to the outer copper conductor of said inlet cable and through which element the inner copper conductor of said inlet cable coaxially extends, an aluminum coupling part having a diameter substantially equal to the diameter of said line cable and being coaxially disposed with respect to said hybrid connecting element and said inlet cable, one end of said coupling part being connected to the aluminum part of said hybrid connecting element and the other end thereof being connected to the outer conductor of said line cable, the inner copper conductor of said inlet cable extending coaxially through said coupling part in insulating relationship thereto and being connected to the copper inner conductor of said line cable, and an insulating sleeve extending from one end of said coupling part in surrounding relationship to said hybrid connecting element and said inlet cable.

2. A device as defined in claim 1, wherein said box is disposed within a rigid frame and the end of said line cable is provided with a surrounding steel sleeve, further including a cardan joint interconnecting said rigid frame and said steel sleeve and a flexible elastomer sleeve surrounding said cardan joint.

3. A device as defined in claim 2, further including an insulating cover disposed about said hybrid connecting element and into contact with the outer conductor of said inlet cable, said insulating sleeve extending into contact with said insulating cover to seal the connection of said copper part of said hybrid connecting element to the outer conductor of said inlet cable.

4. A device as defined in claim 3, wherein an annular pocket is formed between said insulating cover and said insulating sleeve, said annular pocket being filled with a polyisobutylene compound.

5. A device as defined in claim 2, wherein said steel sleeve is joined to one element of said cardan joint by threaded connection.

6. A device as defined in claim 2, wherein said inlet cable has its inner conductor extending coaxially and insulatingly through a copper extension part which is connected to the outer conductor of said inlet cable, and an insulated connecting conductor connected at one end to said extension part and at the other end thereof to an aluminum electrode disposed so as to be electrically at ground potential in use.

7. A device as defined in claim 6, further including an insulating cover disposed about said hybrid connecting element and into contact with the outer conductor of said inlet cable, said insulating sleeve extending into contact with said insulating cover to seal the connection of said copper part of said hybrid connecting element to the outer conductor of said inlet cable.

8. A device as defined in claim 7, wherein said inlet cable has an outer insulating layer extending beneath said insulating cover.

* * * * *